(12) United States Patent
Le Claire et al.

(10) Patent No.: US 6,376,935 B1
(45) Date of Patent: Apr. 23, 2002

(54) METHOD AND DEVICE FOR CONTROLLING SWITCHES IN A CONTROL SYSTEM WITH VARIABLE STRUCTURE, WITH CONTROLLABLE FREQUENCY

(75) Inventors: Jean-Claude Le Claire, Saint Nazaire; Joseph Saillard, Saint-Herblain; Sami Siala; René Le Doeuff, both of Saint Nazaire, all of (FR)

(73) Assignee: Ecole Superieure Atlantique d'Ingenieurs en Genie Electrique, ESA Igelec, Saint Nazaire Cedex (FR)

( * ) Notice: Subject to any disclaimer, the term of this patent is extended or adjusted under 35 U.S.C. 154(b) by 0 days.

(21) Appl. No.: 09/446,934
(22) PCT Filed: Jun. 30, 1998
(86) PCT No.: PCT/FR98/01390
§ 371 Date: Mar. 21, 2000
§ 102(e) Date: Mar. 21, 2000
(87) PCT Pub. No.: WO99/01925
PCT Pub. Date: Jan. 14, 1999

(30) Foreign Application Priority Data

Jul. 1, 1997 (FR) .......................................... 97 08548

(51) Int. Cl.$^7$ ................................................ H01H 47/00
(52) U.S. Cl. ..................................................... 307/125
(58) Field of Search .............................. 307/125, 130, 307/131, 139, 140; 327/156, 157; 331/DIG. 2, 25

(56) References Cited

U.S. PATENT DOCUMENTS

| | | | | | |
|---|---|---|---|---|---|
| 4,091,319 | A | * | 5/1978 | Nguyen | 320/140 |
| 4,965,532 | A | * | 10/1990 | Sakurai | 331/4 |
| 5,059,924 | A | * | 10/1991 | JenningsCheck | 331/1 A |
| 5,294,769 | A | * | 3/1994 | Nishi et al. | 219/117.1 |
| 5,543,753 | A | * | 8/1996 | Williamson | 330/297 |
| 6,112,125 | A | * | 8/2000 | Sandusky | 700/28 |
| 6,208,183 | B1 | * | 3/2001 | Li et al. | 327/161 |

* cited by examiner

Primary Examiner—Peter S. Wong
Assistant Examiner—Pia Tibbits
(74) Attorney, Agent, or Firm—Young & Thompson

(57) ABSTRACT

A method, and a corresponding device, for controlling a power switch in a system with variable structure includes at least a switch capable of being actuated to deliver a given electric signal corresponding to an electric system, based on a control signal taking into account a reference input signal and a feedback signal sampled at the electric system output. The method applies to the control signal an oscillation at a controllable frequency, resulting from the application of a filtering on the feedback signal, the filtering being defined in such a way as to induce a phase shift of −180° between the filtered feedback signal and the electric system input signal, to the controllable frequency.

11 Claims, 9 Drawing Sheets

METHOD AND DEVICE FOR CONTROLLING SWITCHES IN A CONTROL SYSTEM WITH VARIABLE STRUCTURE, WITH CONTROLLABLE FREQUENCY

BACKGROUND OF THE INVENTION

The field of the invention is that of pulse modulation. More particularly, the invention relates to the control of the frequency and width of pulses for the control of switches, and particularly for power switches. Its field of use is in particular that of control systems with a variable structure (control by hysteresis, direct control of coupling (in the DTC angle: "Direct Torque Control")) and modulations with width and/or frequency of pulses (MLI).

The modern electrical devices are comprised principally by four modules shown in FIG. 1.

The source 11 can be continuous, monophase alternating or triphase. The power converter 12 ensures the function of adaptation of the source to the supply type necessary for the good operation of the load 13:

continuous constant source converted into a monophase alternating source with variable frequency and amplitude;

triphase alternating source converted into a continuous source of variable amplitude;

etc.

The management of this conversion of type of source is ensured by the control module 14. This module integrates in general two functions:

subjection (or regulation) of one or several sizes of load, conversion of outputs of the regulators into control signals of the power switches.

The control systems with variable structure are more and more used, relative to conventional controls. This technique is also known as control by sliding mode or direct couple control DTC.

There can be distinguished two general types of control systems with variable structure, respectively in FIGS. 2 and 3.

FIG. 2 shows the case of a structural change by switching of a counter-reaction of condition. The electrical system 21 receives the voltage from an amplifier 22 controlled by a reference voltage delivered by one or another of the modules K1 and K2 ($23_1$ and $23_2$), as a function of the switch 24 controlled by the commutation law S(x)25.

FIG. 3 shows the case of a change of structure by switching to the level of the amplifier (power converter). The commutation law S(x) then controls the switch 31, which delivers the selected voltage $E_{max}$ or $E_{min}$.

The commutation law S(x) is derived from a relationship between the reference and the variables of the condition of the system, so as to ensure the stability, the durability and the observance of the reference, namely:

$u=E_{max} si S(x)>0$ $u=E_{min} si S(x)<0$

This control has the advantage of a very rapid dynamic and a very good strength as to parametric variations. It is possible that the switching takes place at a very high frequency (theoretically infinitely high) such that the system works in the sliding mode.

However, this aspect turns out to be a major drawback in practice. Thus, there is no control over the frequency which requires this type of control for the switches of the power converter 12 which supplies the electrical supply. These frequencies can in certain cases be damaging to the static converter.

This problem is well known. Numerous methods seeking to solve it have already been proposed:

replacing the outlet relays of the regulator with hysteresis, with a band calculated as a function of the parameters of the system, associated with control systems of the width of the hysteresis band as a function of the operating point;

adding an auxiliary estimator and a regulator of the switching frequency. The parameters of this "frequency controller" are computed as a function of the parameters of the system to be controlled;

breaking down the regulator "with variable structure" into two sub-regulators: one is dedicated to the linearization of the model of the system to be controlled and the second is an image of the base regulator. It imposes the dynamic in closed loop and the durability for small variations of parameters.

Moreover, in the case of the regulation of the currents of the triphase motor with alternating current, there exist two typical solutions, control by MLI (modulation of the width of the pulses) and control by hysteresis.

The source is the continuous voltage type (which is to say a mean value which is not zero, in contrast to alternating voltage), the load is a synchronous or asynchronous triphase motor and the power converter is an inverter of triphase voltage (conversion from a constant continuous voltage into three alternate voltages of variable frequency and amplitude). The control means must be subject to the current from the motor with three alternative references, for example sinusoidal.

The principle of the control by MLI is given in FIG. 4.

The error between the reference current 41 and the measured current 42 is processed by a corrector 43. The control of the power switches 44 and 45 is obtained by the comparison 46 of the output of the regulator 43 and the triangular signal 47 of very high frequency relative to that of the reference currents (40 to 100 times, or even more).

This type of control ensures switching of the power switches at a constant frequency (frequency of the triangular signal of modulation), but the inversion of the current is not controlled, depending on the parameters of the load and of the point of operation. The synthesis of the regulator is in general based on the linear automatic control, which introduces an inherent dephasing into the linear transfer functions, at least of using a sophisticated corrector requiring a fairly powerful processor or a very complicated analog card.

In all cases, the quality of direct control is strictly connected to the fineness with which the parameters of the model of the system have been predetermined.

A second method utilized to render more sensitive, relative to the frequency of the current, the performances of the direct control, consists in carrying out a base change by means of a non-linear transformation matrix (so-called Park transformation), which transforms the alternative sizes into continuous components (constants) in the new base. The currents being continuous in this base, the corrections are determined to ensure good performance at zero frequency.

This method permits avoiding the problem of variable frequency of the references for the production of current regulators, but the sensitivity to the parameters of the model of the system remains unchanged relative to the previous method.

The control principle by hysteresis is shown in FIG. 5. It consists in holding by means of three hysteresis comparators 51 (in the case of a triphase system) the real currents in the machine within a band of predetermined width, centered on the reference currents.

The inversion of the current is thus imposed but the frequency of switching is free and variable. It depends principally on the bandwidths imposed and the time constants of the system to be controlled (the motor in this case). This method has the following advantages:

- a simple hysteresis comparator 51 permits directly controlling the currents and generating the controls for the switches of the power converter;
- the direct control is not linear, which leaves the possibility of making almost zero the dephasing and minimizing the gain error between the reference currents and the real currents;
- the performances of the direct control are less sensitive to the parameters of the model of the system.

Furthermore, they have several drawbacks, connected particularly to the poor control of the frequency of switching of the power switches piloted by the control signals 44 and 45;

- switching constraints are very important at the level of the power converter (heating, defects of switching, . . . );
- the variation in frequency of switching can be a source of troublesome audible noises.

None of these known techniques is therefore satisfactory. Thus, they all depend on the parameters of the system to be controlled, which of course degrades the advantages reached by the control with variable structure, particularly in terms of universality.

Moreover, they are often costly. They require the use of complex electrical means, even of very rapid processors.

SUMMARY OF THE INVENTION

The invention particularly has for its object to overcome these drawbacks of the prior art.

More particularly, the invention has for its object to provide a control technique for switching of static converters in a control systems with a variable structure which has very little sensitive to variations of the parameters of the system to be controlled, even practically independent of these latter, as a first approximation.

Another object of the invention is to provide such a technique, which will be simple and less costly to use.

The invention also has for its object supplying such a technique, which can be implanted in an integrated circuit.

The invention also has for its object to provide such a technique, which will be compatible with any type of system, and particularly which can be used as well in monophase systems and in polyphase systems.

These objects, as well as others which will become apparent from what follows, are achieved, according to the invention, with a control process of the durations and periods of conduction of at least one power switch in a control system with a variable structure, which system is of the type comprising at least one switch actuable to deliver a given electrical signal corresponding to an electrical system, as a function of a control system taking account of an input reference signal and feedback signal from an output of said electrical system, according to which process there is applied to said control signal an oscillation with controllable frequency, obtained by use of a filter on said feedback signal, said filtering being defined so as to introduce a dephasing of −180° between the feedback and filtered signal on the one hand, and the input signal of the electrical system on the other hand, at said controllable frequency.

In other words, according to the invention, there is produced a modulation of the control signal. It can thus be determined that the return channel ensures conjointly two functions: a subjection function, because the control signal will follow the input reference signal, and an oscillation function, which permits limiting to a maximum given frequency the swinging of the switches.

It is to be noted that this approach is altogether new for those skilled in the art and that, more precisely, it goes against the prejudices of these latter. Thus, specialists of direct controls always seek, in such systems, to avoid oscillations, considered as synonymous with instability.

The invention also relates to control devices for at least one power switch using such a process. Such a device therefore comprises means for applying to said control signal an oscillation at a controllable frequency obtained by the use of a filter on said feedback signal, said filter being defined so as to induce a dephasing of −180° between the feedback and filtered signal on the one hand, and the input signal of said electrical system on the other hand, at said controllable frequency.

This result is obtained with the help of a function disposed between the output and the input of amplification means. In a particular embodiment, it can be obtained with the help of an electrical analog filter whose self-frequency is adjacent said controllable frequency.

According to embodiments and applications, said controllable frequency can be substantially constant, or adjustable. In this latter case, said filter means can for example comprise a filter with switched capacitors.

Moreover, the device according to the invention can be applied equally well to monophase systems as to polyphase systems.

In the case of a polyphase system, the device preferably comprises, for each of the phases:

- a filter for the feedback signal, said filter being defined so as to induce a dephasing of −180° between the feedback and filtered signal on the one hand, and the input signal of the electrical system on the other hand, at said controllable frequency, and
- a combined low pass and high pass filter, the low pass filter supplying a first comparator and the high pass filter supplying a second comparator, delivering said control signal.

The device of the invention can be provided with the help of analog means, which permit obtaining a very rapid and relatively inexpensive assembly.

It can also, particularly in the case of polyphase systems, be provided with analog and digital processing means. Again, there can also be obtained better performance than with known completely digital systems.

Preferably, the device of the invention is implanted in an integrated circuit. This is possible, because of the relative simplicity of use of the invention. There can thus be produced a single component, finding use in numerous fields.

It will thus be noted that, contrary to the main techniques, the process, the device and the system of the invention do not require a precise recognition of the parameters of the load to be supplied. In other words, the approach of the invention requires at most, as a first approximation, a knowledge of the order of magnitude of the system to be controlled.

The invention also concerns of course the systems for controlling with variable structure, using such a device.

BRIEF DESCRIPTION OF THE DRAWINGS

Other characteristics and advantages of the invention will become more apparent from a reading of the following description of one embodiment of the invention, given by way of simple illustrative example, not limiting, and from the accompanying drawings, in which:

FIG. 1 shows schematically a system to which the invention can be applied;

FIGS. 2 and 3 show two known embodiments of the control of the system with a variable structure corresponding respectively to a change of structure by switching a counter-reaction of condition or by switching at the level of the amplifier;

FIG. 4 shows the principle of control by modulation of pulsewidth, known per se;

FIG. 5 shows the principle of the control by hysteresis, also known;

Figure 1:
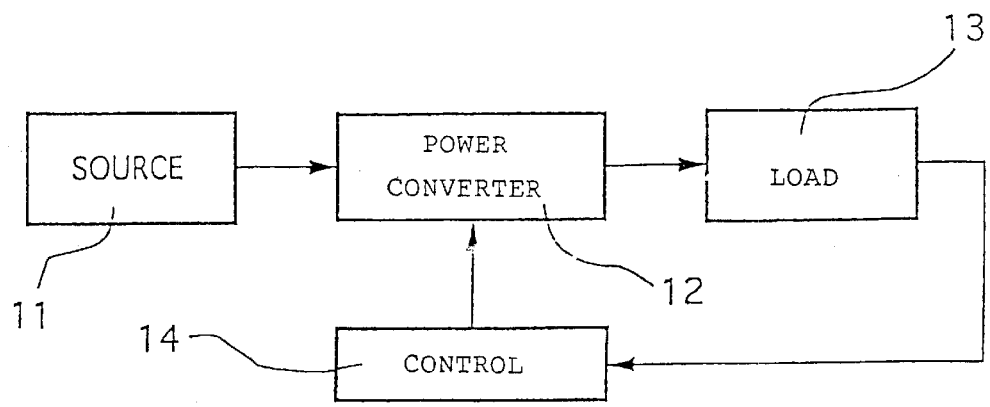
FIGS. 1 to 5, already described, relate to the prior art.
Figure 2:
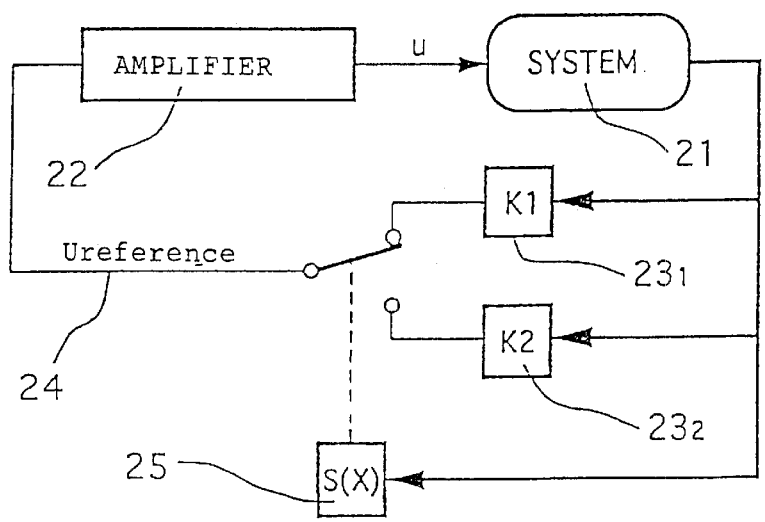
Figure 3:
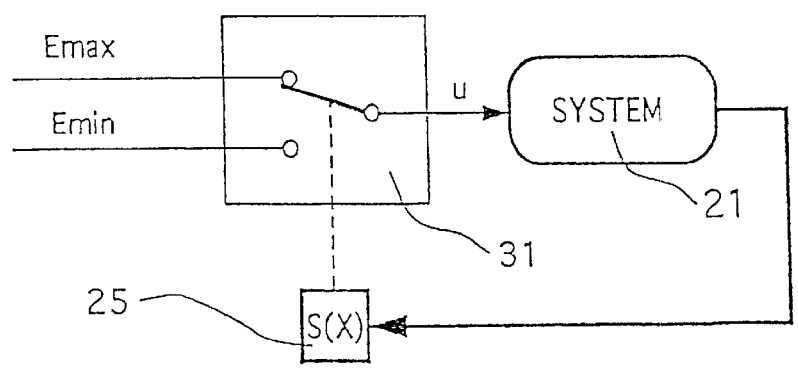
Figure 4:
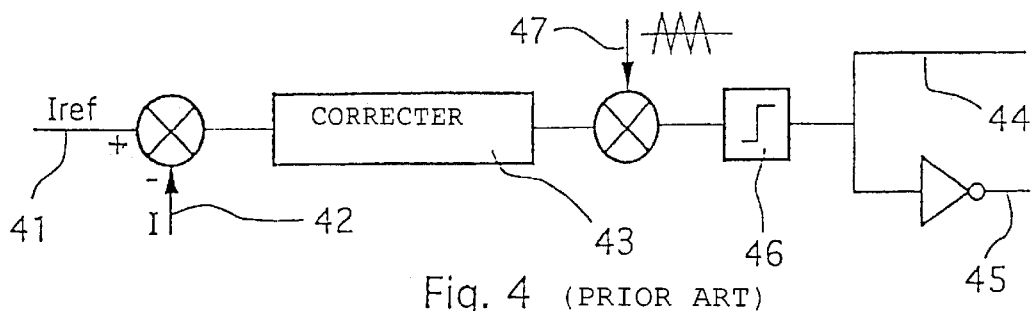
Figure 5:
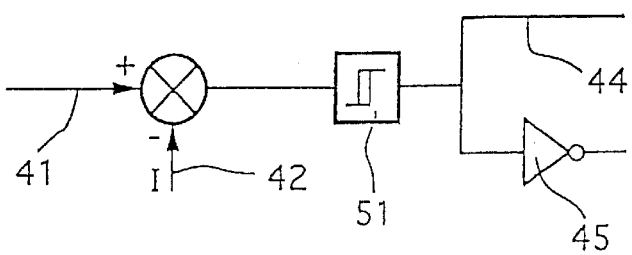
Figure 6A:
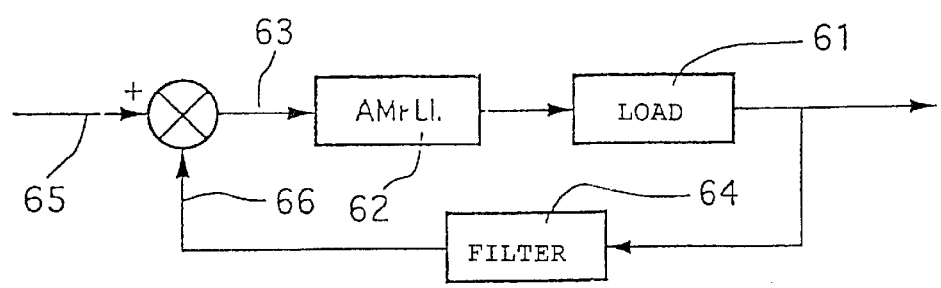
Figure 6B:
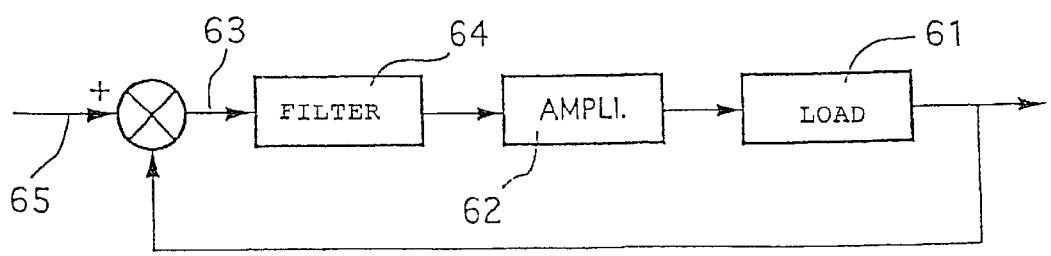
Figure 7:
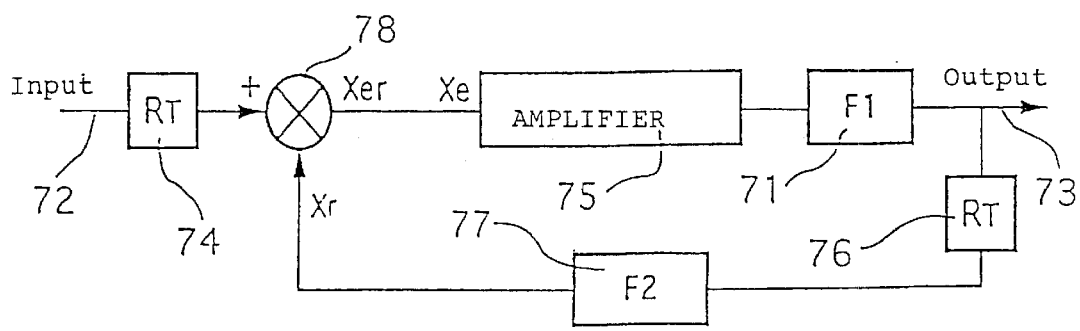
Figure 8:
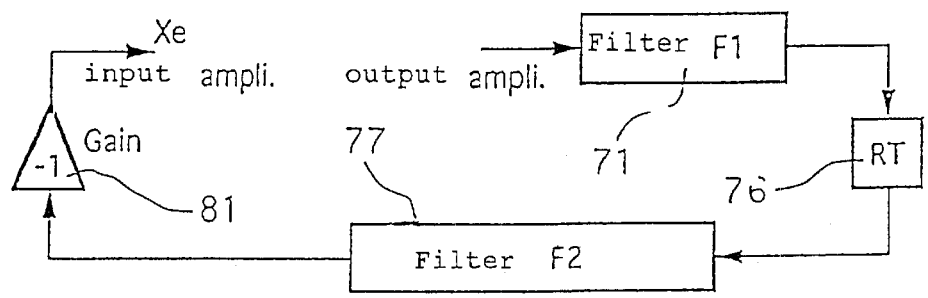
Figure 13:
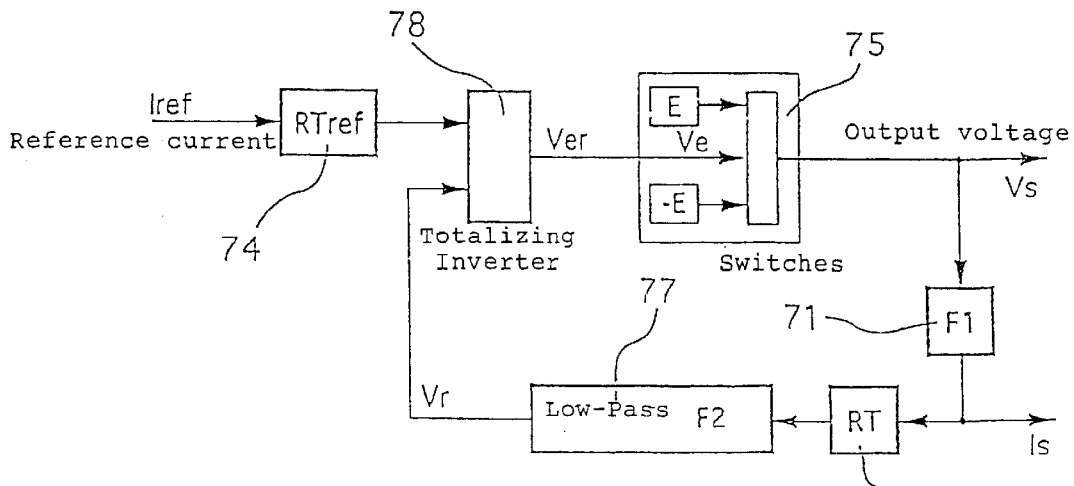
Figure 14:
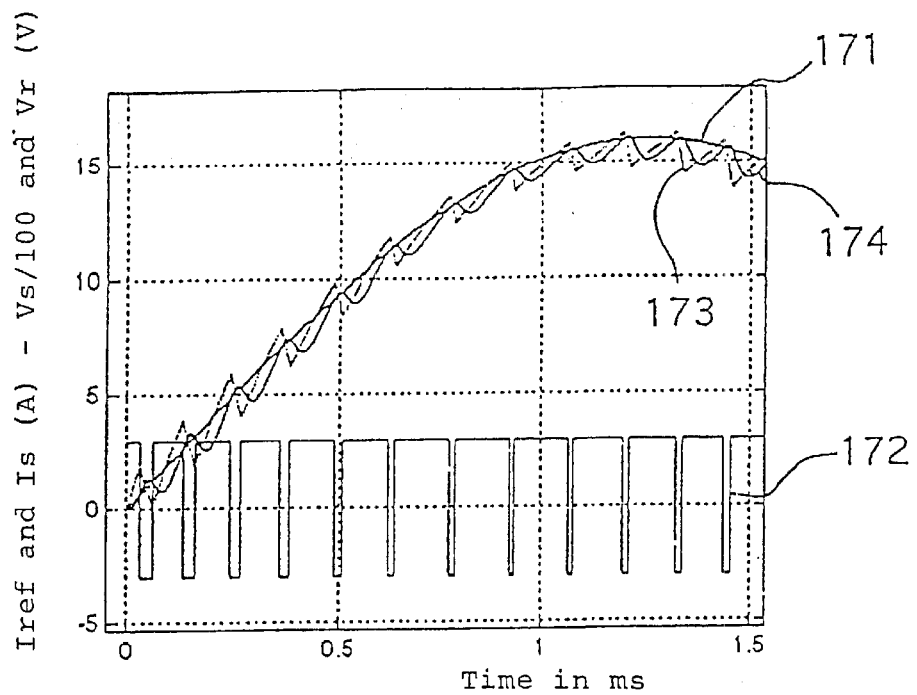
Figure 15:
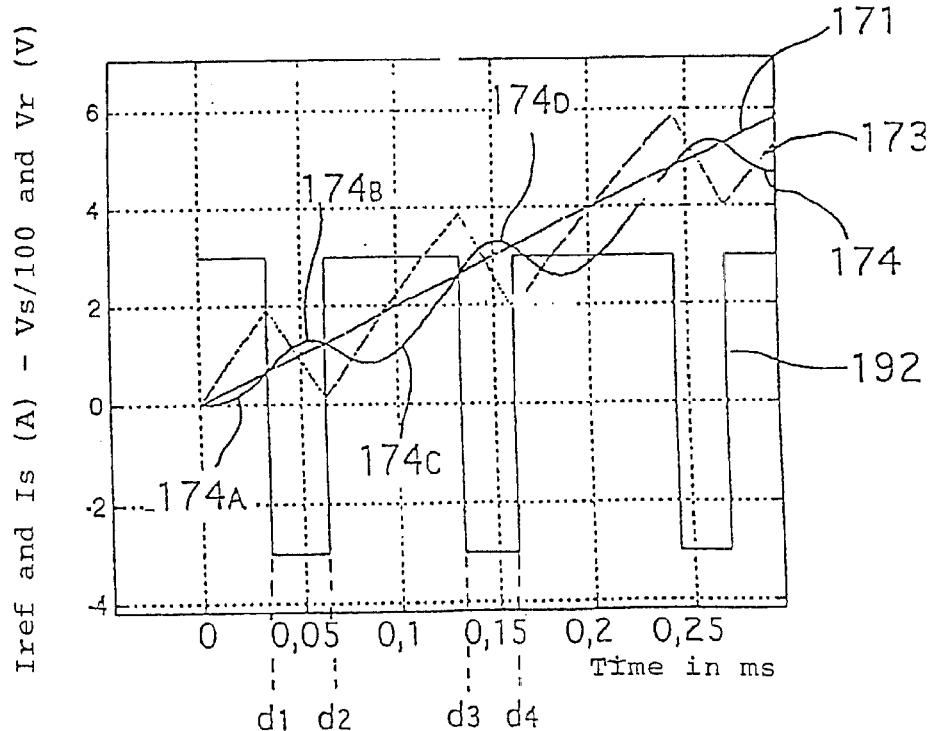
Figure 16:
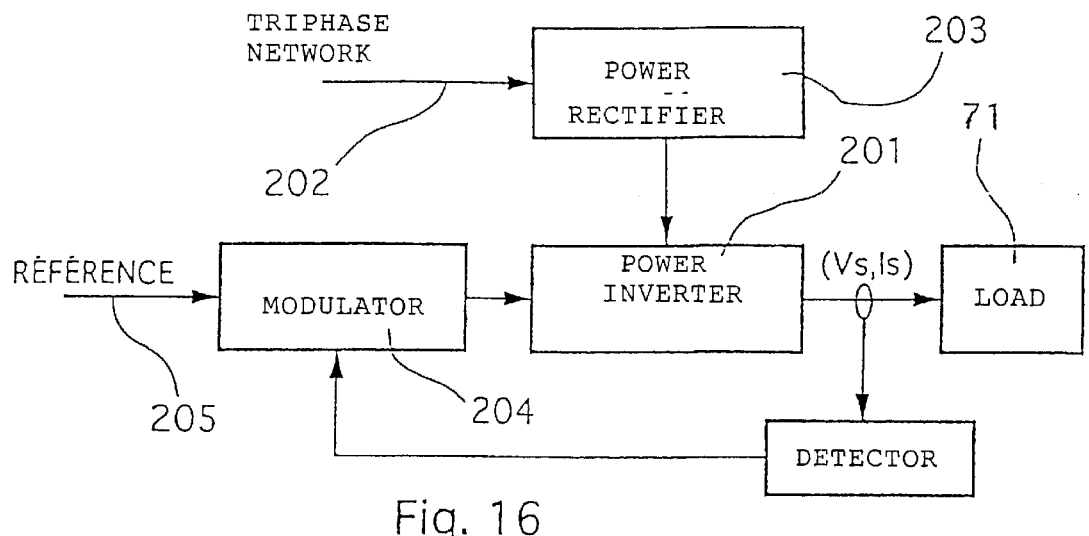
Figure 17:
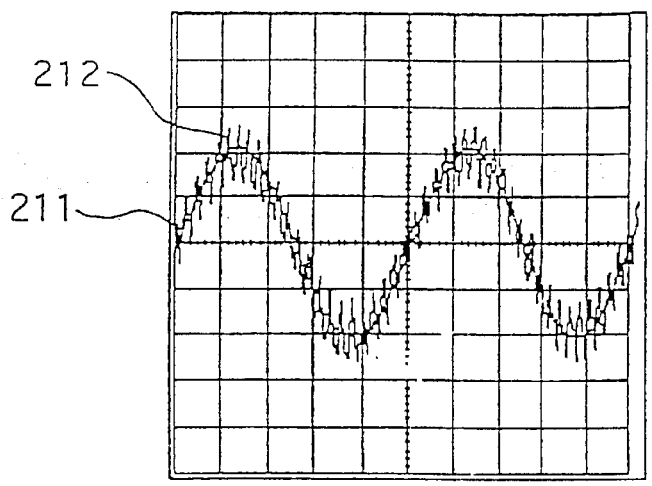
Figure 18:
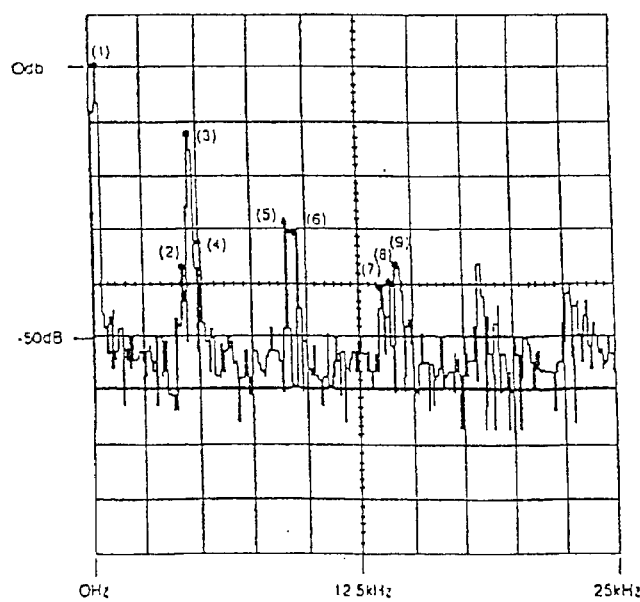
Figure 19:
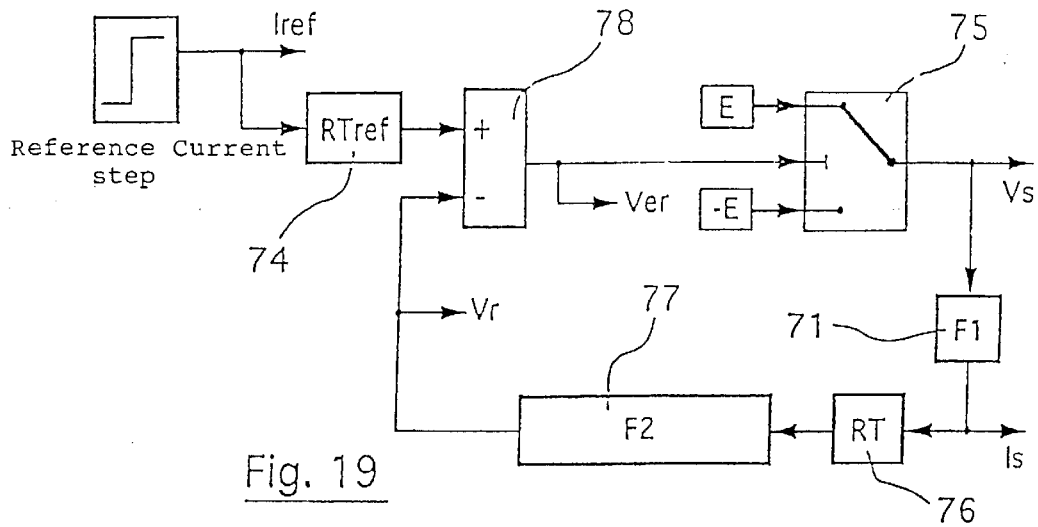
Figures 20, 21:
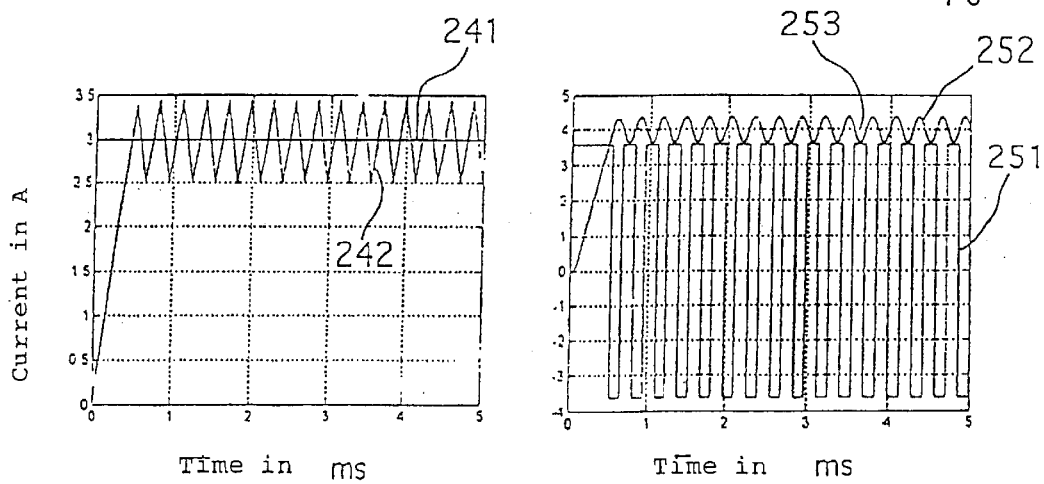
Figure 22:
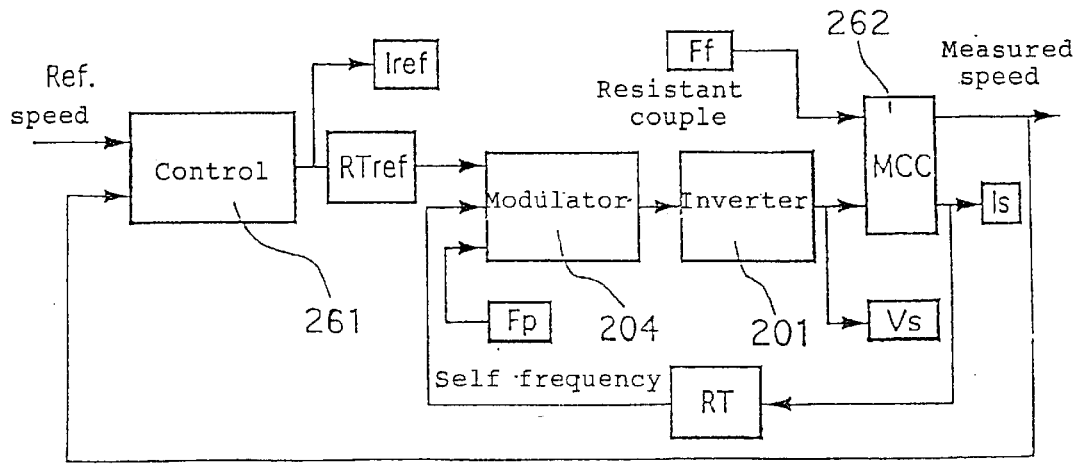
Figure 23:
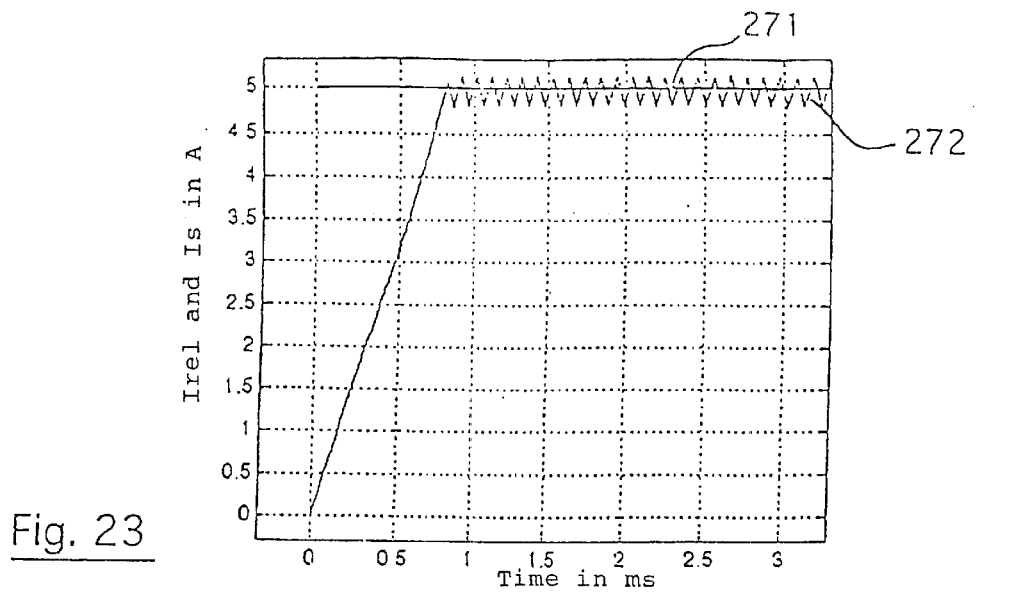
Figure 24:
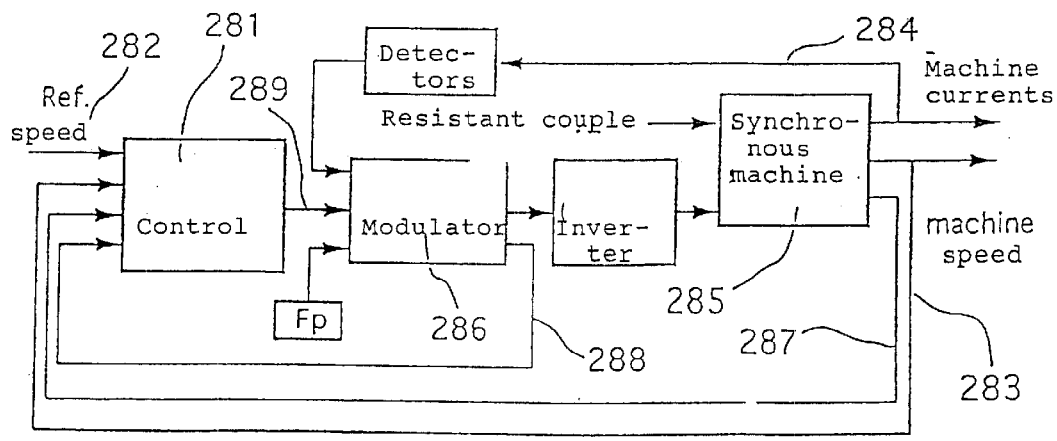
Figure 25:
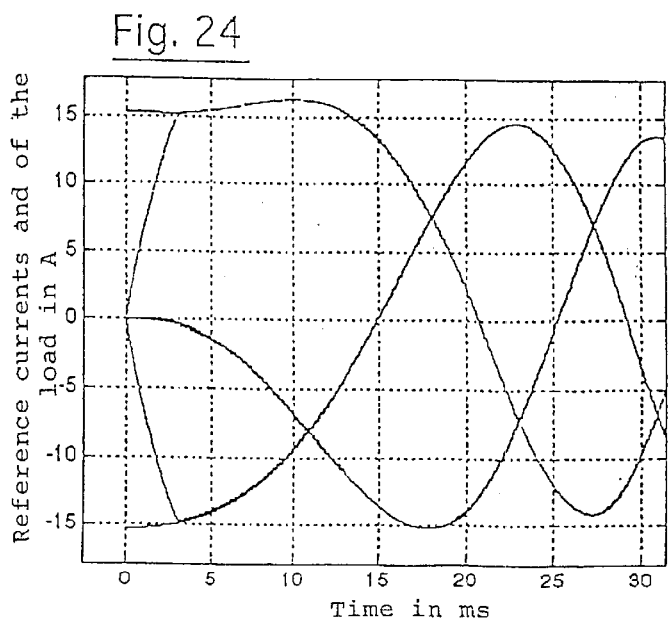
Figure 26:
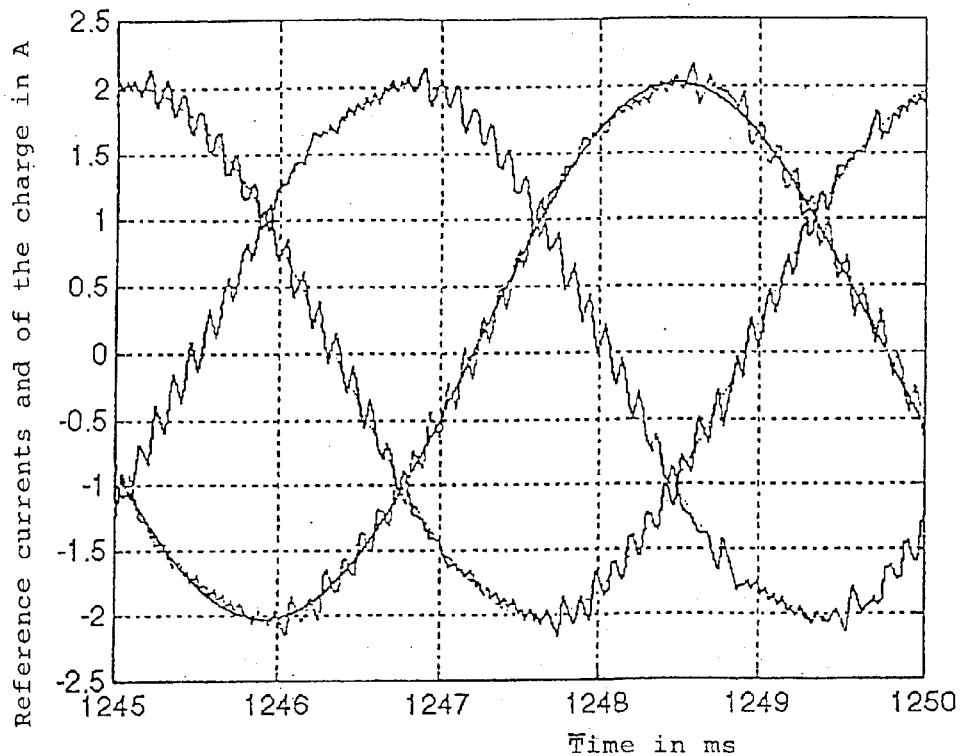
Figure 27:
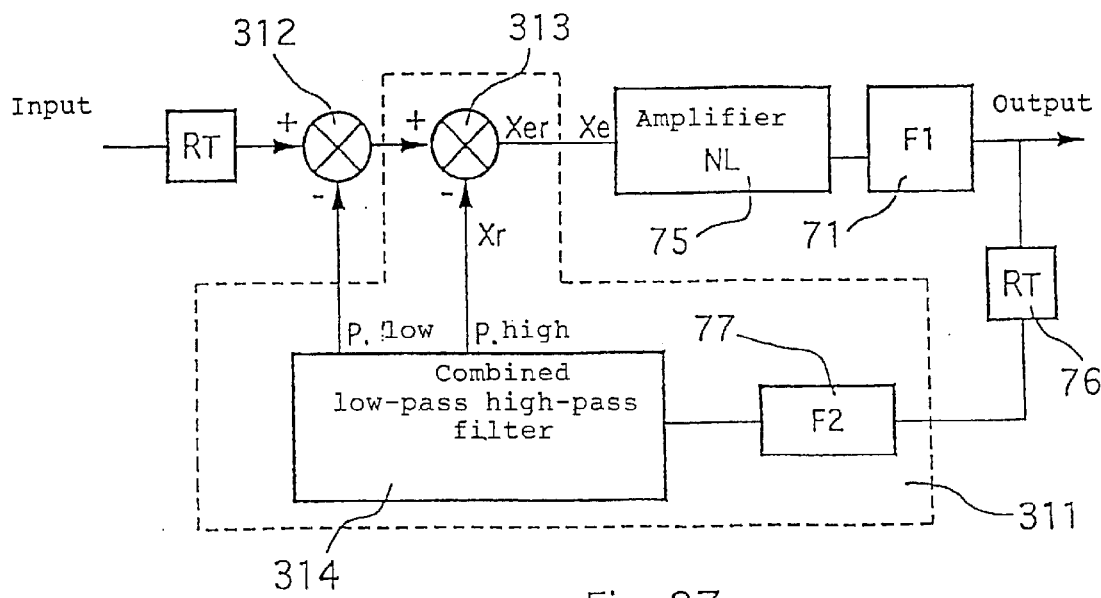

the following figures relate to the invention and its modalities of practice:

FIGS. 6A and 6B show, schematically, the general principle of the invention, according to two possible implantations;

FIG. 7 shows the detailed theoretical structure of a system according to FIG. 6;

FIG. 8 shows the design used to study the linear portion of the system;

FIGS. 9 to 12 are BODE curves of gain and phase for the model of FIG. 8;

FIG. 13 shows the complete system according to the invention;

FIG. 14 shows the signals obtained with the system of FIG. 13;

FIG. 15 is an enlargement of a portion of FIG. 14;

FIG. 16 shows an example of use of the system of the invention;

FIG. 17 shows the signals taken from the system of FIG. 16;

FIG. 18 shows the current spectrum of the load of the system of FIG. 16;

FIG. 19 shows a model for simulation for analysis of the attack of the modulator;

FIGS. 20 and 21 show the signals obtained with the model of FIG. 19;

FIG. 22 shows the case of application of the modulator in a control design of a continuous current motor;

FIG. 23 shows the currents in the case of FIG. 22;

FIG. 24 shows an embodiment of the invention adapted for triphase loads;

FIGS. 25 and 26 show the currents obtained in the case of FIG. 24;

FIG. 27 shows another embodiment, for one phase, in the case of a polyphase load.

DESCRIPTION OF THE PREFERRED EMBODIMENTS

1. Principle of the Invention

FIGS. 6A and 6B show the general principle of the invention. The load 61 to be supplied with electrical power receives conventionally this power from an amplifier 62, whose power switches are controlled by the error signal 63.

As has already been indicated, the novelty of the invention resides principally in the generation of this error signal 63. In other words, the invention provides a new technique for pulse modulation, having numerous advantages.

This signal 63 is thus obtained by the creation of an oscillation produced by the insertion of a filter 64 in the return channel, in the case of FIG. 6A. The signal 63 is hence the difference between the reference signal 65 and the filtered signal 66.

In the case of FIG. 6B, the filter 64 is disposed before the amplifier 62.

Thus, there is obtained an error signal modulated to a frequency adjacent the self-frequency of the filter 64, in a manner practically independent of the characteristics of the load 61.

2. Example of a Modulator 2.1. Synoptic of a Modulator

FIG. 7 shows the theoretical detailed structure of a system using the principle shown in FIG. 6. It therefore comprises a modulator permitting the control of a strong low frequency current in an electrical load 71, as a function of a reference signal 72, which images the current to be produced in this load.

It is constructed on the model of a slave system and is thus provided with a direct channel and a return channel. The input signal is hence the reference current 72, and the output signal is the strong current 73 passing through the load 71.

The direct channel is constituted, from left to right, of the transfer functions $R_T$ 74, a non-linear voltage power amplifier 75 and the function F1 71.

The return channel, from right to left, is constituted by the transfer functions $R_T$ 76 and F2 77 and in fact fulfills two roles, conjointly, which will be described later.

The function $R_T$ 74 is a real and positive trans-impedance.

The function F1 71 is representative of the electrical load, which is mathematically translated, as a first approximation, by a transfer function of the low pass first order type. It introduces no dephasing at very low frequency. Its cutoff frequency is, in practice, several hundred Hertz.

The function F2 is representative of a low pass filter of the second order. It introduces no dephasing, at very low frequency. Its self-frequency is higher than several thousand Hertz.

Input signal 72 and output signal 73, each attack a trans-impedance $R_T$, the two inputs of the comparators 78 are physically homogeneous as to voltage.

The amplifier 75 is of the non-linear type. It receives a signal whose physical nature is hence a voltage. It delivers at its output a voltage as a function of the sign of that applied at the input.

The comparator 78, located between the input transfer function $R_T$ 74 and the amplifier 75, plays two roles: that of an error detector, and that of a dephaser. These two roles will be described later.

Then, the signals present at the negative input of the comparator, the output of the comparator, the input of the amplifier, will be designated respectively $X_r$, $X_e$, and $X_e$, the indices signifying "return", "error" and "input".

2.2. Principle of Operation of the Modulator

A return channel is employed conjointly in two electronic functions.

In the first instance, the return channel provides a counter-reaction to the output 73 on the input of $X_r$ of the comparator 78. It permits obtaining at the output 73 a signal with the image of the signal present at the positive input of the comparator, which is proportional to about the coefficient $R_T$ of the input signal 72 of the modulator.

In this case, the comparator 78 has, at its negative input, a signal which tends permanently toward the signal applied to its positive input, a so-called reference signal.

The comparator associated with the return channel permits subjection of the output current as a function of the input current.

In the second instance, for a particular frequency, the return channel introduces a phase rotation of −180° between the output of the amplifier 75 and the negative input $X_r$ of the comparator 78. This phase rotation is of course dependent on and largely influenced by the filter $_{F2}$ 77.

This phase rotation is from 0° modulo 360 between the output of the amplifier 75 and its input.

The design shown in FIG. 8 is used to obtain results as to dephasing and attenuation provided by the load F1 71, filter F2 77, transfer function $R_T$ 76 and the (gain-1) comparator 81:

This design permits tracing the BODE curves of gain and phase (FIGS. 9 to 12) of the circuit free from the amplifier 75. The numerical base values taken into account, by way of example, are the following:

$R=4.23\Omega$ $R_T=1.35$ V/A $\xi=ksi=0.707$

Figure 9:
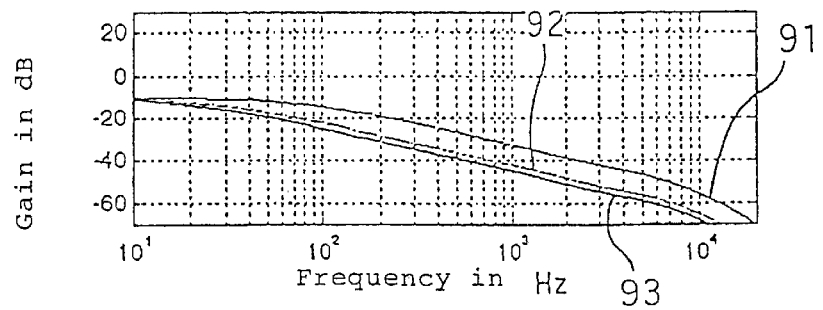
Figure 10:
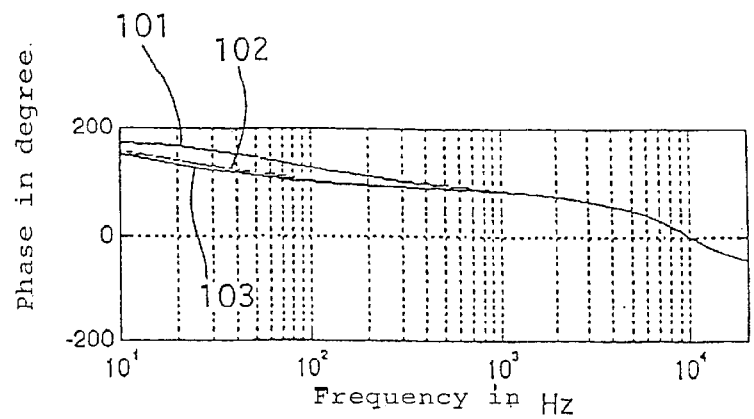
Figure 11:
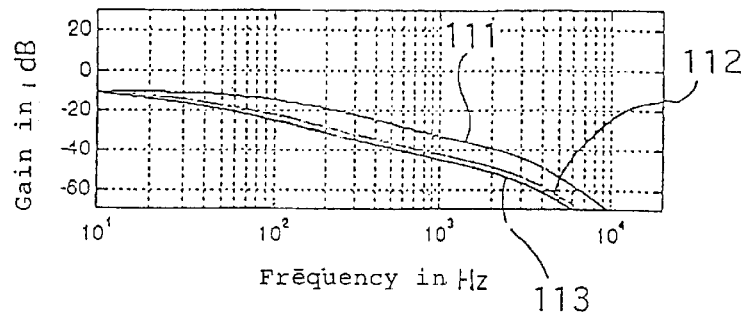
Figure 12:
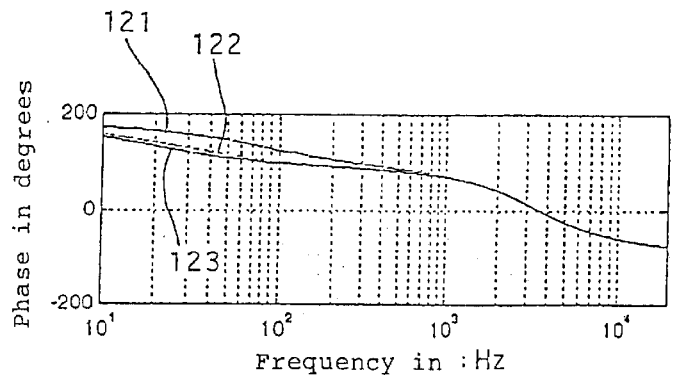

Thus, to judge the role of the filter F2 as to the particular frequency at which dephasing is from 0 degree modulo 360 degrees, there can be observed the obtained dephasing. Three values of L which modify F1 71 are employed:
9.0 mH (curves 91, 101, 111 and 121) or 27.3 mH−67%
27.3 mH (curves 92, 102, 112 and 122)
37.5 mH (curves 93, 103, 113 and 123) or 27.3 mH+37%
For $F_p$ equal to 10 kHz the BODE curves are shown in FIGS. 9 and 10. Similarly, for $F_p$ equal to 3.5 kHz the BODE curves are shown in FIGS. 11 and 12.

These results confirm in the six cases (variations of $F_p$, variations of L) that the particular frequency (dephasing from 0 degree modulo 360 degrees) is very near the self-frequency of the second order filter.

This frequency is therefore, for selected numerical values, less sensitive to the parameters of the electrical load.

The non-linear amplifier 75 permits fulfilling the gain condition. The oscillation conditions are respected.

2.3. The Modulator

This time, the reference input is used. The system shown in FIG. 13, performs simultaneously the subjection of the output current as a function of the low frequency input reference signal and the control of the oscillation frequency $f_{osc}$.

The positive input of the comparator 68 receives sinusoidal data. Thus, the reference current to be reproduced can be of any form. The particular case described below applies to certain uses, of the sinusoidal type. It illustrates the points of analysis which will follow.

The current $I_{ref}$ is thus chosen sinusoidally: $I_{ref}=I.\sin(\omega_s t)$. The following parameters are used to illustrate the following:

L=5 mH

R=15 Ω

τl=333 μs $f_{cf}$=478 Hz $F_p$=10 kHz

I=16 A $f_s$=200 Hz $R_t$=1 V/A

E=300V $\xi$=0.707

The different signals used will have the appearances shown in FIG. 14.

Given the total phase rotation varying from 0 degrees to −450 degrees (extremes of −90 degrees, 0 degree, −180 degrees, with F1, $R_T$, F2, negative input of the comparator), from the output of the non-linear amplifier to its input, there therefore exists a particular frequency for which the system is oscillatory.

Moreover, the slave loop permits obtaining on the negative input of the comparator a signal which tends permanently toward the signal applied to its positive input. The transimpedances. $R_{Tref}$ and $R_T$ being supposed to have identical values, the current $I_s$ tends permanently toward the reference current $I_{ref}$.

In FIG. 14, the reference signals $I_{ref}$ (171), Vs of the amplifier output (172), $I_s$ (173), $V_r$ of return to the comparator (174), show this function. An enlargement of this figure (FIG. 15) permits better visualizing this result.

3. Operation 3.1. Experimental Tests of the Modulator 3.1.1 Practical Embodiment of the Modulator To run these tests, an electronic card has been produced. On this card, it is possible to control the self-frequency of the lowpass filter of the second order $F_2$.77. This control of the self-frequency is effected thanks to the use of a filter with switched capacitors.

3.1.2. Diagram of Use of the Modulator

This diagram is shown in FIG. 16. To run the tests, the switches are located in a power inverter 301 supplied from the triphase network 202, via a power rectifier 203. The modulator 204 is attacked by the reference signal 205 which is a voltage corresponding to the current to be reproduced, multiplied by the value of the transimpedance $R_T$ of the detector.

3.1.3. Tests on Resistive and Inductive Loads

For the experiment, the parameters are the following:

R=4.23 Ω

L=27.3 mH

τl=6.45 ms $R_T$=1.35 V/A E=180V $F_p$=3.64 kHz

I peak current=3 A $f_s$ current frequency=200 Hz

The parameter $R_T$ already encountered in the theoretical analysis, is the transimpedance of the current detector. The "collected" current, in the supply line of the load, is "amplified" by the coefficient, here $R_T$, fixed here at 1.35 V/A.

The reference signal 211 of the modulator and the signal 212 downstream of the current detector, are shown in FIG. 17.

These practical results show the good correspondence of the reference signal 211 and the signal 212 downstream of the detector. The two signals are, as to the first, the reference current amplified by the coefficient $R_T$, for the second, the current in the load multiplied by the same coefficient $R_T$. As a result, the current in the load follows the reference current.

The track of the current in the load, thus obtained, is shown in FIG. 18.

This track shows a maximum at 200 Hz (peak number 1) then a spectral drop to 4200 Hz (peak number 2).

A high amplitude peak appears at 4490 Hz (peak number 3). With the two other peaks on either side, there is here a spectral group indicating indirectly the mean frequency of oscillation, hence of consumption of the power switches.

3.1.4. Sensitivity of the Modulator to Variations of Parameters

The simulation of the attack of the modulator by one step shows that the modulator tends rapidly toward the target current and that the frequency of oscillation stabilizes at a given value.

The simulation model, processed by means of a suitable computer, is shown in FIG. 19.

The typical signals, obtained following the attack by one step of current, are shown in FIGS. 20 and 21:

241: Iref
242: is
251: Vs/50
252: Vr
253: Vref

In the ranges of variation given the different parameters, the oscillation is less sensitive to the electrical parameters of the load. The electrical parameters of the load 71 therefore do not need to be known. Only a very rough order of magnitude needs to be known to fix the parameters of the filter F2 77.

4. Examples of Application 4.1. Adjustment of the Current of a DC Motor

A DC motor can be assimilated to an electromotive force associated with an inductance (L) and a resistance (R).

In this case, the switched supply source is symmetrical (+E, −E), the switched equivalent voltage at the terminals of the impedance (R, L) is dissymmetric.

The preceding theoretical results have shown that the variations of the symmetrical supply voltage influence only very little the supply voltage such that the supply voltage does not fall below a limit value. For a dissymmetrical source, the modulator also adapts itself.

This adaptation of the modulator is shown in FIG. 22.

As a function of the target speed, the control 261 generates the reference current value which must flow in the DC machine (MCC) 262. A protective stage limits the startup current. This limit current is selected arbitrarily, in the example which follows, as being 5 A.

FIG. 23 shows the reference currents (271) and in the load (272).

4.2. Control of the Current of a Synchronous Triphase Motor

The modulator of the invention is also adapted to triphase loads. In a synchronous machine, a simulation of the operation from the diagram of FIG. 24 is proposed.

The control 281 elaborates the reference currents as a function of the reference speed 282, of the speed 283 of the machine 285 and of the measured currents 284 which have been subject to preprocessing by filtering within the same modulator.

The control 281 does not recognize the electrical parameters of the machine 285. Neither does the modulator 286.

At startup of the machine, the reference currents and the simulated currents in the machine are shown in FIG. 25.

The observation of the currents in the machine, controlled by the triphase modulator 286, shows that these currents recover and then follow their respective references (see FIG. 26, in the case of high speed).

4.3. Control of the Current in a Polyphase System

In polyphase, and in the case of slave currents, the structure for each phase can be modified as shown in FIG. 27.

In this case, the modulator can be limited to the broken line 311. The modulator controls the frequency of oscillation and delivers a filtered image of the currents measured at the first input comparator.

The filter F2 77 can also be disposed between the high pass output of a combined filter 314 and the negative input of the second comparator 313, because this filter acts at high frequency. The filter F2 can also be disposed between the output of the second comparator 13 and the input of the amplifier 75.

The modulator is again in this case completely producible in analog electronics.

The first comparator 312 can be provided in digital electronics with or without a processor. The signals to be processed by the possible processor are thus low frequency.

For motor control, the algorithm executed by this hypothetical processor need not recognize the electrical parameters of the load.

In the case of triphase systems, the splitting of the input comparator into two comparators 312 and 313 permits comparing the sizes of the prefiltered reference and return in the diphase references of Concoordia and Park, known in electrotechnology. It is thus possible to take advantage of the triphase MLI, namely the surmodulation of the amplitudes of the voltages.

5. Generalization

The invention therefore provides a structure using a non-linear amplifier of the type of a relay without hysteresis, associated with two modules whose input/output functions correspond respectively to the system to be controlled (F1) and to the new module of the invention (F2). This structure is capable of subjecting a reference signal whose low frequency spectrum can be anything at all, and to control conjointly an oscillation of higher frequency superposed on the slave signal.

This oscillation permits, according to the invention, the switching of one or several power switches employed in the field of use with or without counterelectromotive force, monophase or polyphase.

In this structure, a knowledge of the electrical parameters of the load is not necessary.

This structure is completely producible in analog electronics. It could also be mixed (analog and digital).

What is claimed is:

1. A Process for controlling at least one power switch in a control system with a variable structure, the at least one switch being actuable to deliver a given electrical signal to an electrical system, as a function of a control signal taking into account an input reference signal and a feedback signal from an output of the electrical system, the process comprising the step of:

applying to the control system an oscillation at a controllable frequency obtained by sending the feedback signal through a filter, the filter being defined so as to induce a dephasing of −180° between the feedback signal and the input reference signal at said controllable frequency that is adjacent to a self-frequency of the filter.

2. The device according to claim 1, wherein the controllable frequency is substantially constant.

3. The device according to claim 1, wherein the controllable frequency is adjustable.

4. The device according to claim 3, wherein the filter has switched capacitors.

5. A control device for at least one power switch in a control system of variable structure, the at least on switch being actuable to deliver a given electrical signal to an electrical system, as a function of a control signal taking into account a reference input signal and a feedback signal from an output of the electrical system, the control device comprising:

means for applying to said control system an oscillation at a controllable frequency obtained by sending said feedback signal through a filter;

said filter inducing a dephasing of −180° between the feedback signal and the input signal at said controllable frequency that is adjacent to a self-frequency of said filter.

6. The device according to claim 5, wherein the input signal is from a monophase power source.

7. The device according to claim 5, wherein the input signal is from a polyphase power source.

8. The device according to claim 7, further comprising one said filter for each phase of said polyphase power source, and a combined low pass and high pass filter, the low pass filter supplying a first comparator and the high pass filter supplying a second comparator, delivering said control signal.

9. The device according to claim 5 that is implanted in an integrated circuit.

10. A control system with variable structure, comprising at least one power switch actuable to deliver an electrical signal to an electrical system, as a function of a control signal taking into account a reference input signal and a feedback signal from an output of said electrical system, the system comprising:

applying to said control signal an oscillation of a controllable frequency obtained by sending said feedback signal through a filter;

said filter inducing a dephasing of −180° between the feedback signaland the input signal at said controllable frequency that is adjacent to a self-frequency of said filter.

11. A process for controlling a power switch in a control system that sends a control signal to a load in response to an input reference signal, the process comprising the steps of:

feeding an output from the load through a filter that has a self-frequency and feeding the filtered output back to the input reference signal;

combining the filtered output with the input reference signal to oscillate the input reference signal at a controllable frequency that is adjacent to the self-frequency of the filter, the filter inducing a dephasing of −180° between the output and the input reference signal; and feeding the oscillating input reference signal to the control system to control the power switch.

* * * * *